United States Patent
Sashida

(10) Patent No.: US 6,717,508 B2
(45) Date of Patent: Apr. 6, 2004

(54) VEHICLE ANTI-THEFT MATCHING SYSTEM

(75) Inventor: Tetsuaki Sashida, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 359 days.

(21) Appl. No.: 09/977,957

(22) Filed: Oct. 17, 2001

(65) Prior Publication Data

US 2002/0050922 A1 May 2, 2002

(30) Foreign Application Priority Data

Oct. 27, 2000 (JP) ..................................... 2000-328166

(51) Int. Cl.$^7$ .............................................. G05B 19/00
(52) U.S. Cl. .............. 340/5.72; 340/426.1; 340/426.15; 340/426.19; 340/825.36; 340/825.49; 340/426.3; 340/988; 340/989; 340/992; 701/32; 701/36; 701/200; 701/201; 701/207; 701/213; 307/10.2; 342/357.07; 342/357.17; 342/457
(58) Field of Search ............................. 340/5.72, 426.1, 340/426.15, 426.19, 825.36, 825.49, 988, 989, 426.3, 992; 701/32, 36, 200, 201, 207, 213; 342/357.07, 357.17, 457; 307/10.2

(56) References Cited

U.S. PATENT DOCUMENTS

| 5,532,690 A | * | 7/1996 | Hertel ......................... 340/989 |
| 5,550,551 A | * | 8/1996 | Alesio ......................... 342/457 |
| 5,796,178 A | * | 8/1998 | Onuma ....................... 307/10.2 |
| 6,166,688 A | * | 12/2000 | Cromer et al. .......... 342/357.17 |

\* cited by examiner

*Primary Examiner*—Michael Horabik
*Assistant Examiner*—Yves Dalencourt
(74) *Attorney, Agent, or Firm*—Oliff & Berridge, PLC

(57) ABSTRACT

In a vehicle anti-theft matching system, password matching is effected only when a mismatch between a current vehicle position acquired from a car navigation system 1 and an authorized storage area registered in a position registration section 11 beforehand has existed for a period of time exceeding a given period. When the vehicle is returned to the authorized storage area within a given period of time, the vehicle is deemed to remain unstolen. Thus, password matching is not performed. Labor imposed on an authorized owner when his/her vehicle is driven in a normal state can be mitigated as compared with the case of a related-art system which always performs matching for identifying an authorized owner.

3 Claims, 3 Drawing Sheets

VEHICLE ANTI-THEFT MATCHING SYSTEM

BACKGROUND OF THE INVENTION

1. Field of the Invention

The present invention relates to a vehicle anti-theft matching system.

2. Description of the Related Art

There has been available a matching system which requires setting of a password unique to a driver as an anti-theft measure. Before driving a vehicle, a driver enters his/her password, and the matching system matches the password with a previously-set password. There has also been available a matching system by way of which a driver registers his/her fingerprint or voice pattern beforehand. Subsequently, the matching system matches an input fingerprint or voice pattern with the registered fingerprint or voice pattern.

In the event that no match exists between a password or fingerprint entered before driving a vehicle and the previously-registered password or fingerprint, the matching system inhibits startup of the engine. If a burglar attempts to drive a stolen vehicle, driving of the vehicle is inhibited, thus preventing theft of the vehicle.

Every time a driver starts driving a vehicle, the matching system always requires the driver to perform an operation for effecting matching of a password or fingerprint, thus imposing a heavy workload on the driver. In the event that a driver desires to drive a vehicle immediately, the system still requires the driver to perform matching operation, thus posing inconvenience to the driver.

SUMMARY OF THE INVENTION

The present invention is aimed at providing a mobile anti-theft matching system capable of lessening the burden imposed on a driver before he/she drives a vehicle.

In order to solve the problem, the present invention provides a vehicle anti-theft matching system comprising:

a position registration section for registering an authorized storage area of a vehicle;

a position comparison section for determining, through comparison, whether or not a current vehicle position detected by the current position detection means matches the previously-registered authorized storage area;

a comparison/determination section which determines, on the basis of a result of comparison performed by the position comparison section, whether or not a mismatch between the current vehicle position and the authorized storage area has existed for a continuous period of time exceeding a predetermined period of time, and which authenticates the driver as the authorized owner of the vehicle when the mismatch has existed over the given period of time; and vehicle travel control means for imposing predetermined limitations on travel of the vehicle when the driver cannot be authenticated as the authorized owner on the basis of a result of matching performed by the comparison/determination section.

Preferably, the authorized owner is ascertained by means of matching of a password entered by way of a predetermined control panel.

Preferably, the present invention also provides a vehicle anti-theft matching system comprising:

vehicle travel control means for controlling travel of a vehicle;

a position registration section for registering an authorized storage area of a vehicle;

a position comparison section for determining, through comparison, whether or not a current vehicle position detected by the current position detection means matches the previously-registered authorized storage area;

a comparison/determination section which determines, on the basis of a result of comparison performed by the position comparison section, whether or not a mismatch between the current vehicle position and the authorized storage area has existed for a continuous period of time exceeding a predetermined period of time, which sends at least an identification code assigned uniquely to the vehicle and information about a current vehicle position to a predetermined security center by way of a predetermined radio communication section, and which sets the vehicle travel control means in a normal vehicle travel enable state when a predetermined signal is returned from the security center.

DETAILED DESCRIPTION OF THE PREFERRED EMBODIMENTS

Now, a description will be given in more detail of preferred embodiments of the invention with reference to the accompanying drawings.

{First Embodiment}

It is generally thought that if a vehicle has been stolen by a burglar, the vehicle will never be returned to a storage area to which the vehicle belonged until it was stolen. In consideration of this concept, when a match exists between a current vehicle position and an authorized storage area of the vehicle, such as an authorized parking area belonging to the vehicle's owner, the vehicle can be inferred to remain unstolen.

In contrast, if the vehicle remains located away from the authorized storage area for a long period of time, there is a possibility of a vehicle having been stolen.

Therefore, a vehicle anti-theft matching system according to a first embodiment of the present invention effects matching of a password or fingerprint only when a vehicle remains away from an authorized storage area for a continuous period of time exceeding a predetermined period. If the vehicle is returned to the authorized storage area within a given period of time, the vehicle is deemed to remain unstolen. Hence, in this case the matching system does not perform matching of a password or fingerprint.

<Configuration>

Figure 1:
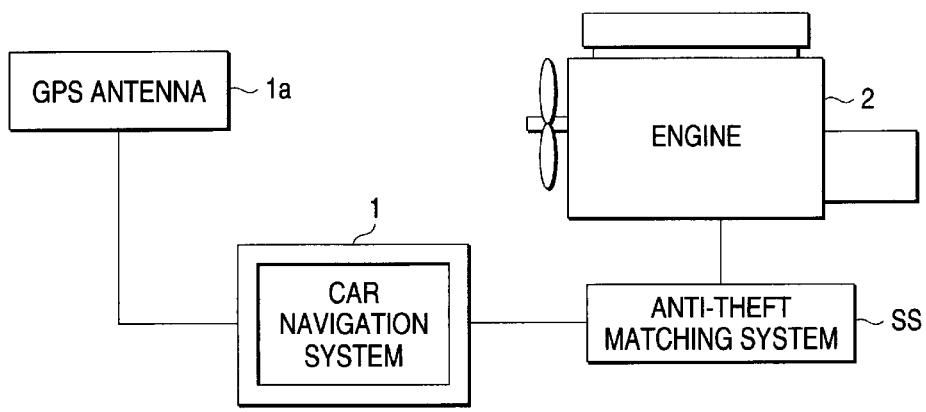
FIG. 1 is a block diagram showing the principal configuration of a vehicle to which a vehicle anti-theft matching system according to a first embodiment of the present invention is installed.
Figure 2:
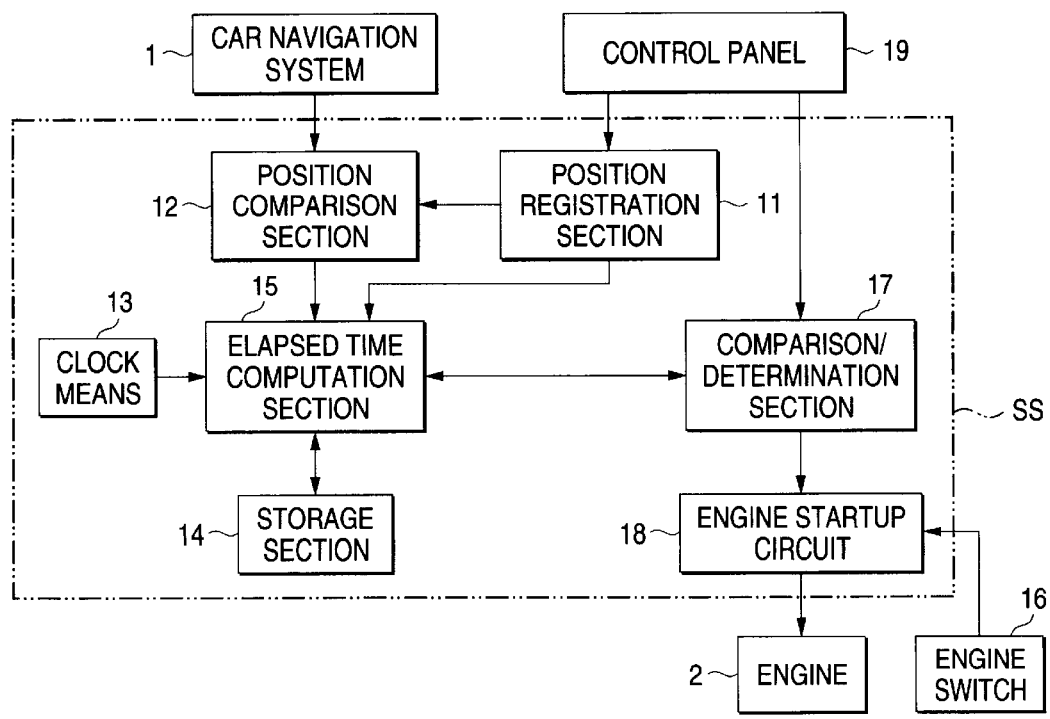
FIG. 2 is a block diagram showing the vehicle anti-theft matching system according to the first embodiment.

FIG. 1 is a block diagram showing the principle configuration of a vehicle to which a vehicle anti-theft matching system has been applied. FIG. 2 is a block diagram showing the configuration of the vehicle anti-theft matching system.

As shown in FIG. 1, the vehicle anti-theft matching system SS detects a mismatch when the current vehicle position detected by a car navigation system (current position detection means) 1 does not match a previously-registered position. Before an engine 2 is started up, the system SS performs matching of a password. If a match exists between the entered password and the registered password, the system SS allows startup of the engine 2. In contrast, if no match is found, startup of the engine 2 is inhibited. If it has been determined that the vehicle has located at the registered area even once within a given period of time, processing pertaining to a matching determination process required for starting the engine 2 is omitted.

More specifically, as shown in FIG. 2, the vehicle anti-theft matching system comprises a position registration section 11 for registering an authorized storage area of a vehicle; a position comparison section 12; an elapsed-time computation section 15; a comparison/determination section 17; and an engine startup circuit (vehicle travel control means) 18. The position comparison section 12 compares the current vehicle position acquired by way of the car navigation system 1 with an authorized storage area registered in the position registration section 11. The elapsed-time computation section 15 computes, on the basis of a timing counting operation performed by clock means 13 and data stored in a storage section 14, a time which has elapsed since the position comparison section 12 last detected a match between the current vehicle position and the authorized storage area or since when password matching was last determined to be appropriate, whichever event occurred most recently. When the elapsed time computed by the elapsed-time computation section 15 is determined to have exceeded a given period of time, the comparison/determination section 17 performs password matching for authenticating the driver. The engine startup circuit 18 starts the engine 2 in accordance with a signal output from the comparison/determination section 17.

By means of operation of a predetermined control panel (including a control section of the car navigation system) 19 provided on an instrument panel, the position registration section 11 registers an authorized storage area in built-in memory as data of format corresponding to map information employed by the car navigation system 1.

The position comparison section 12 compares the current vehicle position acquired by way of the car navigation system 1 with the authorized storage area registered in the position registration section 11. If a match exists, the position comparison section 12 outputs an active signal to the elapsed-time computation section 15. The position comparison section 12 performs a comparison operation at given time intervals or every time there arises a specific status, such as shutdown of the engine (the timing at which the comparison operation is performed is hereinafter called a "position comparison timing").

The elapsed-time computation section 15 has several functions. Namely, when an engine switch 16 is inactive and the main power is active, the elapsed-time computation section 15 perceives the date and time at which the computation section 15 has received the active signal from the position comparison section 12, on the basis of the result of time count operation formed by the clock means 13. The elapsed-time computation section 15 stores data pertaining to the date and time as data pertaining to the "final appropriate status time," thereby updating the storage section 14. Moreover, at a point in time when the elapsed-time computation section 15 has received an engine start enable signal (which will be described later) from the comparison/determination section 17, the elapsed-time computation section 15 perceives the date and time on the basis of a result of time counting operation performed by the clock means 13. The date and time is stored as the "final appropriate status time," thereby updating the storage section 14. Further, the elapsed-time computation section 15 has the function of computing a time elapsed since the "final appropriate status time" every given period and outputs the thus-computed elapsed time to the comparison/determination section 17. Information about a date and time at which an authorized storage area has been registered in the position comparison section 12 is employed as an initial value for the "final appropriate status time."

The comparison/determination section 17 performs a first engine enable function, an engine disable function, a password input request function, a second engine enable function, and an anomaly detection function. In the first engine enable function, when the engine 2 remains in a state before starting after an accessory key of the vehicle has been turned on, an engine start enable signal is transmitted to the engine startup circuit 18 when the elapsed time output from the elapsed-time computation section 15 falls within a certain predetermined period of time. In the engine disable function, if the elapsed-time output from the elapsed-time computation section 15 has exceeded a given time (hereinafter called an "elapsed-time excess state"), an engine start enable signal is not transmitted to the engine startup circuit 18. In the password input request function, the elapsed-time excess state is in effect, and the driver is required to enter a password by way of the control panel 19, with the aid of displaying operation of an unillustrated display device or voice guidance operation of a voice output device. In the second engine enable function, an engine start enable signal is transmitted to the engine startup circuit 18 and the elapsed-time computation section 15 when a match exists between the password entered by way of the control panel 19 and the previously-registered authorized password. In the anomaly detection function, processing is terminated as being anomalous while startup of the engine remains unallowed, if no match is found. When an anomalous state has been detected by means of the anomaly detection function, the display device or the sound output device (both unillustrated) informs the driver of a message such as "Incorrect Password."

The engine startup circuit 18 has the function of enabling startup of the engine 2 upon receipt of an engine start enable signal from the comparison/determination section 17 and the function of inhibiting startup of the engine 2 regardless of operation of the engine switch 16 when receiving no engine start enable signal from the comparison/determination section 17 (called an "engine start lock state").

The position registration section 11, the position comparison section 12, the elapsed-time computation section 15, and the comparison/determination section 17 are functional elements which are implemented by predetermined software within a common CPU connected to ROM and RAM. The functions of these elements are specified by a software program. Reference numeral 1a shown in FIG. 1 designates a GPS antenna.

<Operation>

Figure 3:
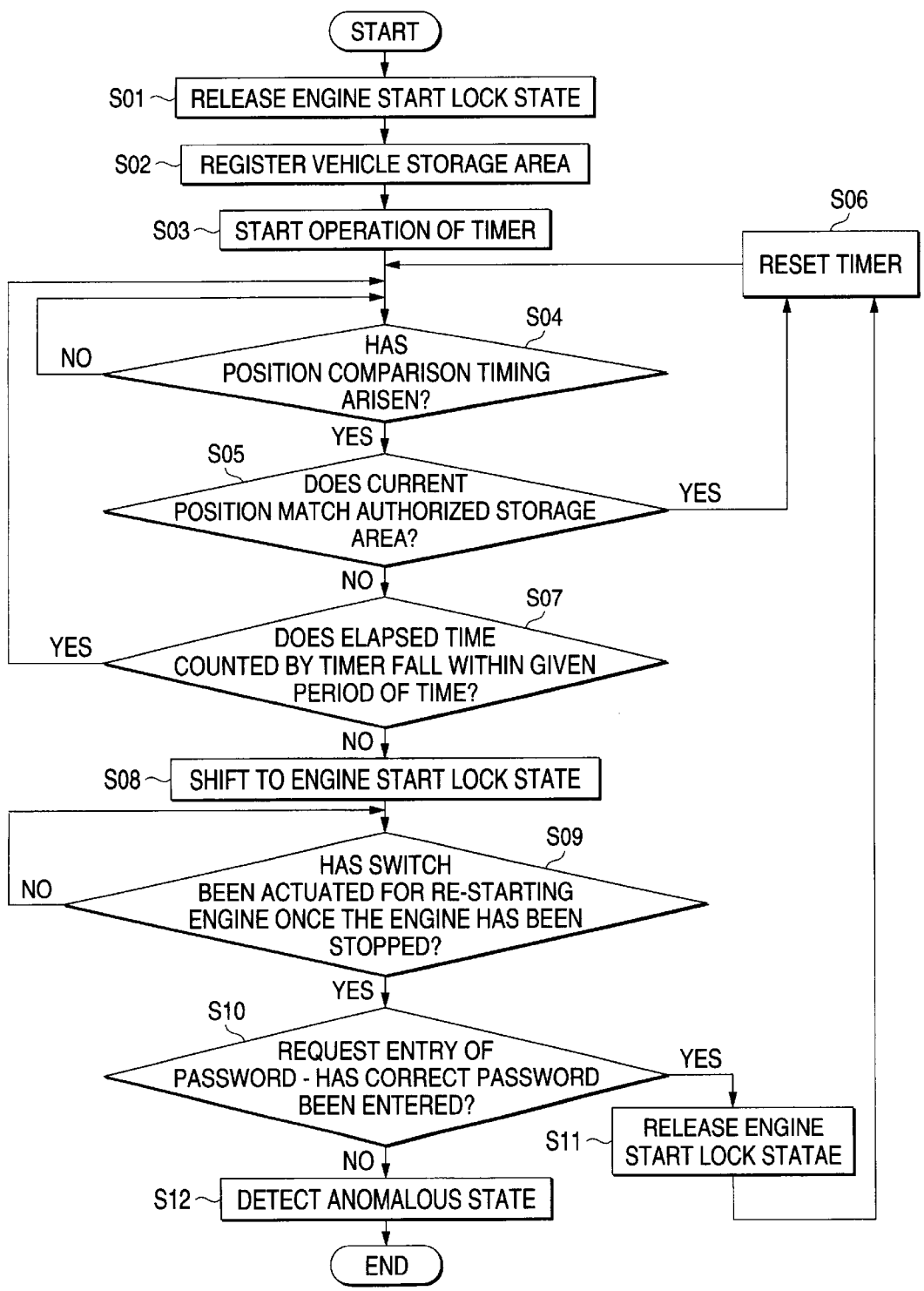
FIG. 3 is a flowchart showing the operation of the vehicle anti-theft matching system according to the first embodiment.

The operation of the vehicle anti-theft matching system having the foregoing configuration will now be described by reference to a flowchart shown in FIG. 3.

At a point in time when a vehicle anti-theft matching system is installed in a vehicle, in step S01 an engine is released from a default state (initial state); that is, an engine start lock state. If the vehicle anti-theft matching system is removed at the time of theft, the vehicle returns to the engine start lock state, thus inhibiting a burglar from driving the vehicle.

In step S02 an owner of the vehicle registers an authorized storage area into the position registration section 11 as data of type matching map information of the car navigation system 1.

At this time, in step S03 the elapsed-time computation section 15 perceives information about a date and time at which registration has been carried out, from the result of operation of the clock means 13. The thus-perceived date and time are stored in the storage section 14 as initial data pertaining to a final appropriate status time. As a result, a start time at which the elapsed-time computation section 15 is to start computing is set initially. The elapsed-time computation section 15 starts computing an elapsed time (a timer start) at a point in time when the accessory key is turned on and power is supplied to the vehicle anti-theft matching system SS.

When detecting in step S04 a predetermined position comparison timing, such as an every time interval or occurrence of a vehicle having entered a specific state such as a standstill state, the position comparison section 12 compares the current position of the vehicle output from the car navigation system 1 with the authorized storage area registered in the position registration section 11 in step S05. When a match exists, the position comparison section 12 outputs an active signal to the elapsed-time computation section 15.

At a point in time when the elapsed-time computation section 15 has received the active signal from the position comparison section 12, the elapsed-time computation section 15 perceives the date and time of receipt of the active signal on the basis of a result of clocking operation performed by the clock means 13. Data pertaining to the date and time are stored in the storage section 14 as data pertaining to a "final appropriate status time" in an updating manner, thus resetting a timer (step S06). Subsequently, processing pertaining to step S04 and subsequent steps is iterated.

If in step S05 the result of comparison operation performed by the position comparison section 12 shows that no match exists between the current vehicle position acquired from the car navigation system 1 and the authorized storage area registered in the position registration section 11, processing proceeds to step S07.

In step S07, the elapsed-time computation section 15 computes, at every predetermined period, a time which has elapsed from the "final appropriate status time" stored in the storage section 14. The thus-computed elapsed time is output to the comparison/determination section 17. The comparison/determination section 17 determines whether or not the elapsed time output from the elapsed-time computation section 15 falls within a predetermined period of time.

When the elapsed time has been determined to fall within a given period of time, an engine startup signal is transmitted to the engine startup circuit 18. In this state, the engine startup circuit 18 does not enter an engine start lock state. Consequently, when the engine switch 16 is turned on, the engine 2 starts. Then, processing pertaining to step S04 and subsequent steps is iterated.

When in step S07 the comparison/determination section 17 has detected, on the basis of the signal output from the elapsed-time computation section 15, an elapsed-time excess status (in which the elapsed time counted by the timer has exceeded a given period of time), processing proceeds to step S08. No engine start enable signal is output to the engine startup circuit 18. In this state, the engine startup circuit 18 remains in an engine start lock state. Hence, the engine 2 will not start operation, regardless of operation of the engine switch 16.

After the engine 2 has become stationary, in step S09 an ignition switch is actuated for starting the engine 2.

In step S10, the comparison/determination section 17 requests an operator to enter a password by way of the control panel 19, by means of a display on a predetermined display device or voice guidance output from a sound output device. When the password is entered by way of the control panel 19 in response to the request, the comparison/determination section 17 determines, through comparison, whether or not the input password matches the previously-registered authorized password. If a match is found through comparison, an engine start enable signal is sent to the engine startup circuit 18 and the elapsed-time computation section 15. Processing then proceeds to step S11.

In step S11, at a point in time when the engine start enable signal is output from the comparison/determination section 17, the engine startup circuit 18 releases the engine start lock state. In this state, the engine startup circuit 18 does not proceed to the engine startup lock state. Hence, when the engine switch 16 is turned on, the engine 2 starts operation.

Processing then proceeds to step S06. On the basis of the engine start enable signal output from the comparison/determination section 17, in step S06 the elapsed-time computation section 15 stores data pertaining to the date and time of receipt of the engine start enable signal into the storage section 14 as data pertaining to the "final appropriate state time" in an updating manner, thereby resetting the timer. Subsequently, processing pertaining to step S04 and subsequent steps is iterated.

When in step S10 the comparison/determination section 17 has determined that no match exists between the password entered by way of the control panel 19 and the authorized password, processing proceeds to step S12. In step S12, a message stating "Incorrect Password" is reported by means of the display device or the sound output device (not shown), and processing is terminated while the engine startup circuit 18 remains in an engine start lock state.

Even if a vehicle equipped with such a vehicle anti-theft matching system is stolen, a burglar cannot drive the vehicle unless he/she enters an authorized password within a given period of time when attempting to start the engine 2, thus effectively preventing theft of the vehicle.

As mentioned above, password matching is effected only when a vehicle remains away from the authorized storage area for a continuously period of time exceeding a given period. If the vehicle is returned to the authorized storage area, the vehicle is deemed to be in an unstolen state, and password matching is not effected. Hence, the present invention can mitigate labor imposed on an authorized owner when the vehicle is driven in a normal state as compared with the case where matching is always performed for verifying an authorized owner.

Matching of current vehicle position and matching of a password are performed not during operation of the engine 2, but after the stationary state of the engine 2 has been checked. Hence, stoppage of the engine 2 during its operation can be prevented. Once the engine 2 has been stopped, the engine 2 will not start again, thus preventing, with considerable effectiveness, a burglar from conducting theft.

In this case, a determination can be readily made as to whether or not the vehicle has been stolen, by means of utilization of only map information employed by the car navigation system 1. Hence, there can be provided a vehicle anti-theft matching system of simple configuration.

{Second Embodiment}
<Configuration>

Figure 4:
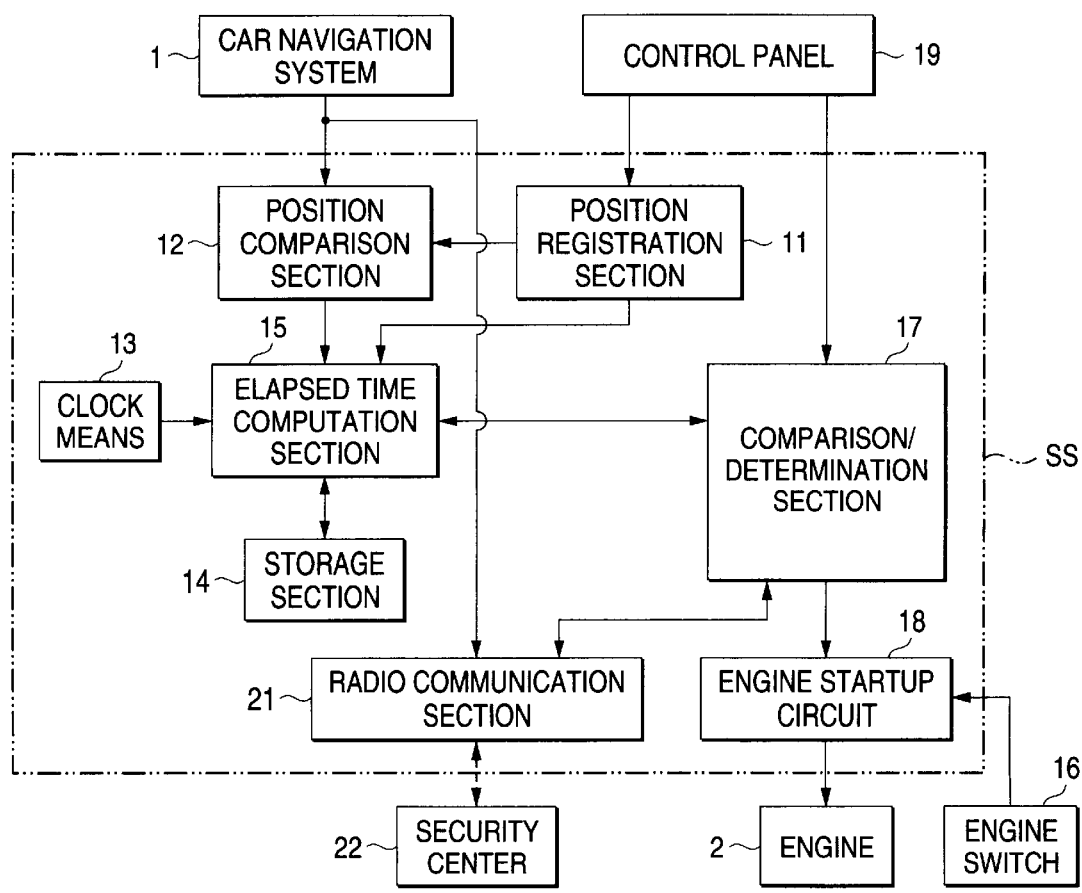
FIG. 4 is a block diagram showing a vehicle anti-theft matching system according to a second embodiment of the present invention.

FIG. 4 is a block diagram showing a vehicle anti-theft matching system according to a second embodiment of the present invention. In FIG. 4, those elements which are identical in function with those described in connection with the first embodiment are assigned the same reference numerals.

As in the case of the first embodiment, when a vehicle remains away from an authorized storage area for a period of time exceeding a given period, the vehicle anti-theft matching system according to the present invention does not release the engine startup circuit 18 from an engine start lock state. The comparison/determination section 17 does not perform password matching as a requirement for releasing the engine startup circuit 18 from the engine start lock state. Predetermined transmission information is sent to a predetermined external security center 22 by way of a radio communication section 21. The security center 22 performs matching operation so as to determine whether or not the vehicle has been stolen. Particularly, the present vehicle anti-theft matching system transmits, along with the information to be sent from the radio communication section 21 to the security center 22, information about a current vehicle position acquired from the car navigation system 1. Hence, the security center 22 can ascertain the current position of a stolen vehicle.

The information to be sent from the radio communication section 23 is to include an arbitrary "magic number," in addition to an individual ID (identification code) assigned uniquely to an individual vehicle beforehand and the current vehicle position acquired from the car navigation system 1. Here, for instance, the magic number is a password entered by way of the control panel 19 of the vehicle.

Alternatively, the current vehicle position to be included in the transmission information may be information about the latitude and longitude of a vehicle, address information, or information encoded by another scheme.

The comparison/determination section 17 converts these information items into encoded data of predetermined scheme and sends the data to the security center 22 by way of the radio communication section 21 through wireless communication.

The security center 22 receives the encoded data through wireless communication and reversely converts the data, thereby reconstructing an individual ID (identification number) assigned to the vehicle, current position information about the vehicle, and the magic number. On the basis of the individual ID, the security center 22 determines whether or not a theft report concerning the vehicle has been issued. If the vehicle matches the theft report, the current position information about the vehicle is ascertained.

If the theft report has not been issued, predetermined unlock command data are sent to the vehicle through wireless communication for releasing the vehicle from the engine start lock state. The vehicle receives the unlock command data by way of the radio communication section 21 through wireless communication. The comparison/determination section 17 ascertains the unlock command data. On the basis of the command data, the comparison/determination section 17 instructs the engine startup circuit 18 to release the engine start lock state.

As mentioned above, the present embodiment yields an advantage of the security center 22 being able to ascertain the position of a stolen vehicle, in addition to the advantage yielded by the first embodiment. Hence, there is yielded an advantage of the ability to take immediate measures against burglary.

According to the present embodiment, only an individual ID of a vehicle and current position information may be transmitted to the security center 22 without involvement of entry of a password. In the first embodiment, if an authorized owner has forgotten the password, he/she cannot drive the vehicle. In contrast, according to the second embodiment, after having ascertained that no theft report concerning the vehicle has been issued, the security center 22 sends unlock command data for releasing an engine start lock. Hence, the owner of the vehicle can drive the vehicle without mishap.

In each of the embodiments, a password has been employed as means for matching. Needless to say, another measure, such as a fingerprint or a voice pattern, may also be employed for authenticating the driver as the authorized owner.

In the present embodiment, the car navigation system 1 has been employed as current position detection means for detecting a current vehicle position. However, there may also be employed any type of system which detects a current vehicle position through use of GPS.

In the present embodiment, when it has been determined that a vehicle has been stolen, the engine startup circuit (vehicle travel control means) 18 inhibits startup of the engine 2. However, the engine startup circuit 18 may perform any operation, so long as a limitation is imposed on normal vehicle travel, such as a limitation for suppressing the rotational speed of the engine 2 to a given rotational speed or less, thus enabling only low-speed travel of the vehicle or a limitation for automatically deactivating the engine 2 after lapse of a given period of time after starting of the engine 2.

According to a first invention, password matching is effected only when a vehicle remains away from an authorized storage area for a continuous period of time exceeding a given period. Hence, when the vehicle is returned to the authorized storage area within a given period of time, the vehicle is deemed to remain unstolen. Hence, no password matching is performed. The present invention can mitigate labor imposed on an authorized owner when the vehicle is driven in a normal state as compared with a related-art vehicle anti-theft system which always performs matching for verifying an authorized owner.

According to the present invention, only when a vehicle remains away from an authorized storage area for a continuous period of time exceeding a given period, an identification code assigned uniquely to the vehicle and information about the current position of the vehicle are transmitted to a predetermined security center by way of a predetermined radio communication section. When a predetermined signal has been returned from the security center, the engine startup circuit is set to an engine start enable state. Hence, when radio communication has been established between the vehicle and the security center, an investigation is made as to whether or not a theft report concerning the vehicle assigned the identification code included in the received information has been issued. If a theft report has been issued, the security center can ascertain the position of the stolen vehicle. Consequently, there is yielded an effect of the ability to take immediate measures against burglary.

What is claimed is:

1. A vehicle anti-theft matching system comprising:
   a position registration section for registering an authorized storage area of a vehicle;
   a current position detector that detects a current vehicle position;
   a position comparison section for determining, through comparison, whether or not the current vehicle position detected by said current position detector matches the previously-registered authorized storage area;
   a comparison/determination section which determines, on the basis of a result of comparison performed by the position comparison section, whether or not a mismatch between the current vehicle position and the authorized storage area has existed over a continuous period of time exceeding a predetermined period, and which authenticates the driver as the authorized owner of the vehicle when the mismatch has existed over the predetermined period of time; and
   a vehicle travel controller for imposing predetermined limitations on travel of the vehicle when the driver cannot be authenticated as the authorized owner on the basis of a result of matching performed by the comparison/determination section.

2. The vehicle anti-theft matching system according to claim 1, wherein the authorized owner is ascertained by matching of a password entered by way of a predetermined control panel.

3. A vehicle anti-theft matching system comprising:
   a vehicle travel controller for controlling travel of a vehicle;
   a position registration section for registering an authorized storage area of a vehicle;
   a current position detector that detects a current vehicle position;
   a position comparison section for determining, through comparison, whether or not the current vehicle position detected by said current position detector matches the previously-registered authorized storage area;
   a comparison/determination section which determines, on the basis of a result of comparison performed by the position comparison section, whether or not a mismatch between the current vehicle position and the authorized storage area has existed over a continuous period of time exceeding a predetermined period, which sends at least an identification code assigned uniquely to the vehicle and information about a current vehicle position to a predetermined security center by way of a predetermined radio communication section, and which sets the vehicle travel controller in a normal vehicle travel enable state when a predetermined signal is returned from the security center.

* * * * *